US012640322B2

(12) United States Patent
Zhong et al.

(10) Patent No.: US 12,640,322 B2
(45) Date of Patent: May 26, 2026

(54) RELAY MOVABLE SPRING CAPABLE OF REDUCING TEMPERATURE RISE AND RELAY

(71) Applicant: Xiamen Hongfa Electric Power Controls Co., Ltd., Xiamen (CN)

(72) Inventors: Shuming Zhong, Xiamen (CN); Wenguang Dai, Xiamen (CN); Fangneng Li, Xiamen (CN); Guojin Liao, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 333 days.

(21) Appl. No.: 18/256,633

(22) PCT Filed: Dec. 3, 2021

(86) PCT No.: PCT/CN2021/135492

§ 371 (c)(1),
(2) Date: Jun. 8, 2023

(87) PCT Pub. No.: WO2022/127627

PCT Pub. Date: Jun. 23, 2022

(65) Prior Publication Data

US 2024/0021392 A1 Jan. 18, 2024

(30) Foreign Application Priority Data

Dec. 15, 2020 (CN) ......................... 202011479332.4
Dec. 15, 2020 (CN) ......................... 202023023996.8

(51) Int. Cl.
*H01H 50/56* (2006.01)
*H01H 50/12* (2006.01)

(52) U.S. Cl.
CPC ............ *H01H 50/56* (2013.01); *H01H 50/12* (2013.01)

(58) Field of Classification Search
CPC ............................... H01H 50/56; H01H 50/12
(Continued)

(56) References Cited

U.S. PATENT DOCUMENTS 6,771,154 B1 * 8/2004 Funayama ............... H01H 9/40 335/83
7,659,800 B2 * 2/2010 Gruner ............... H01H 51/2281 335/185
(Continued)

FOREIGN PATENT DOCUMENTS

CN 2681311 Y 2/2005
CN 102969205 A 3/2013
(Continued)

OTHER PUBLICATIONS

First Office Action for JP Patent Application No. 2023-536005 of Jul. 9, 2024.

(Continued)

*Primary Examiner* — Shawki S Ismail
*Assistant Examiner* — Lisa N Homza
(74) *Attorney, Agent, or Firm* — Perilla Knox & Hildebrandt LLP; Kenneth A. Knox

(57) ABSTRACT

A relay movable spring capable of reducing temperature rise comprising movable contacts, a movable spring sheet and a movable spring lead-out sheet. The movable spring sheet has an opposite first end and second end. The first end is connected to the movable spring leading-out sheet; the movable spring sheet comprises at least two current-carrying conductors; at least two movable contacts are provided, which are fixed to the at least two current-carrying conductors respectively, and which are close to the second end of the movable spring sheet, so that the movable spring sheet forms at least two parallel structures; and a connecting sheet
(Continued)

is also mounted on the movable spring sheet, the connecting sheet connecting the at least two movable contacts.

16 Claims, 6 Drawing Sheets

(58) Field of Classification Search
USPC .......................................................... 335/196
See application file for complete search history.

(56) References Cited

U.S. PATENT DOCUMENTS

| | | | |
|---|---|---|---|
| 9,548,173 B2 | 1/2017 | Connell | |
| 2009/0033446 A1* | 2/2009 | Gruner | H01H 51/2281 335/129 |
| 2013/0057370 A1 | 3/2013 | Kubono et al. | |
| 2014/0062626 A1 | 3/2014 | Saito et al. | |

FOREIGN PATENT DOCUMENTS

| | | | |
|---|---|---|---|
| CN | 105050675 | A | 11/2015 |
| CN | 107833792 | A | 3/2018 |
| CN | 207489771 | U | 6/2018 |
| CN | 110867351 | A | 3/2020 |
| CN | 112542356 | A | 3/2021 |
| CN | 214378262 | U | 10/2021 |
| CN | 214378263 | U | 10/2021 |
| EP | 2131377 | A1 | 12/2009 |
| EP | 3113204 | A1 | 1/2017 |
| EP | 3089190 | B1 | 10/2020 |
| JP | 2013054846 | A | 3/2013 |
| JP | 2015159025 | A | 9/2015 |
| JP | 2017084657 | A | 5/2017 |
| JP | 2017139196 | A | 8/2017 |
| WO | 2015125319 | A1 | 8/2015 |
| WO | 2017107892 | A1 | 6/2017 |

OTHER PUBLICATIONS

Notice of Allowance for CN Patent Application No. 202011479332.4 of Sep. 23, 2024.
First Office Action for EP Patent Application No. 21905556.3 of Feb. 7, 2025.
Extended European Search Report for EP Patent Application No. 21905556.3 of Apr. 11, 2024.
International Search Report for International Application No. PCT/CN2021/135492 mailed Feb. 22, 2022.
First Office Action for JP Patent Application No. 2024202860 of Sep. 24, 2025.

* cited by examiner

RELAY MOVABLE SPRING CAPABLE OF REDUCING TEMPERATURE RISE AND RELAY

CROSS-REFERENCE TO RELATED APPLICATIONS

This application is a national phase application of International Application No. PCT/CN2021/135492, filed on Dec. 3, 2021, which claims the benefit of and priority to Chinese Patent Application No. 202011479332.4 filed on Dec. 25, 2020 and Chinese Patent Application No. 202023023996.8 filed on Dec. 25, 2020, the disclosures of which are hereby incorporated by reference in their entireties.

TECHNICAL FIELD

This disclosure relates to the technical field of relays and, in particular, to a relay movable spring and a relay.

BACKGROUND

A relay is an electronic control device, being a control system (also called an input loop) and a controlled system (also called an output loop), and usually used in an automatic control unit. The relay is actually an automatic switch that may control a larger current with a smaller current, so that it plays a role of automatic adjustment, safety protection and switching circuits in the circuit. The relay is of a heat-sensitive component, when the temperature exceeds a tolerable temperature, plastic and insulating materials inside the relay may accelerate aging, which can cause contacts to be oxidized and corroded such that arc extinction becomes difficult, decay technical parameters of the electrical components, and reduce reliability and other drawbacks.

The movable spring is a component which temperature is easy to rise in relay. The movable spring is generally composed of a movable contact, a movable spring piece and a movable spring leading-out piece. The movable contact is fixed at one end of the movable spring piece, and the other end of the movable spring piece is fixed to the movable spring leading-out piece. During the operation of the relay, one end of the movable spring piece fixed with the movable contact swings around the other end (which is the end fixed to the movable spring leading-out piece) of the movable spring piece, and the movable spring piece is an operating component and also a current-carrying conductor, so that the movable spring piece is the component most likely to rise temperature. In the related art, a rated current is usually adjusted to an appropriate range, to allow the product to meet the temperature requirements. As the application of the replay is increasing, the relay may have a development trend of high load and miniaturization; however, the increase of the rated current may inevitably lead to increasing the temperature of the movable spring piece, so that it is urgent to solve a problem of how to effectively reduce the temperature rise of the movable spring piece.

BRIEF SUMMARY

A relay movable spring capable of reducing temperature rise includes movable contacts, a movable spring piece and a movable spring leading-out piece. The movable spring piece has a first end and a second end opposite to each other, the first end is connected with the movable spring leading-out piece, and the movable spring piece includes at least two current-carrying conductors; at least two movable contacts are provided and respectively fixed on the at least two current-carrying conductors and close to the second end of the movable spring piece, so that at least two parallel structures are formed on the movable spring piece. A connecting piece is mounted on the movable spring piece and connected with the at least two movable contacts.

According to an embodiment of the present disclosure, at least one straight slit extends along a direction from the second end of the movable spring piece to the first end of the movable spring piece, and the at least one straight slit divides the movable spring piece into the at least two current-carrying conductors.

According to an embodiment of the present disclosure, at least one of the current-carrying conductors of the movable spring has a width larger than remaining ones of the current-carrying conductors.

According to an embodiment of the present disclosure, at least one of the movable contacts has a thickness larger than remaining ones of the movable contacts.

According to an embodiment of the present disclosure, the movable contact with the large thickness is fixed on the current-carrying conductor with the large width.

According to an embodiment of the present disclosure, the movable spring piece comprises a plurality of sub spring pieces stacked together.

According to an embodiment of the present disclosure, a U-shaped bending part is arranged in a middle section of the movable spring piece.

According to an embodiment of the present disclosure, the movable spring comprises a first sub spring piece, a second sub spring piece, a third sub spring piece and a fourth sub spring piece stacked in sequence, wherein each of the first sub spring piece, the second sub spring piece, the third sub spring piece and the fourth sub spring piece is provided with two straight slits, to form three current-carrying conductors; and three movable contacts are provided and respectively fixed on the corresponding current-carrying conductors, so that three parallel structures are formed on the movable spring piece; a U-shaped bending part is arranged on the current-carrying conductor of each of the first sub spring piece, the second sub spring piece and the third sub spring piece, and the U-shaped bending part is not arranged on the current-carrying conductor of the fourth sub spring piece.

According to an embodiment of the present disclosure, an arc-shaped slit is arranged on the current-carrying conductor of the fourth sub spring piece, and is located at a side of the movable contact away from the movable spring leading-out piece, so that an end of the current-carrying conductor of the fourth sub spring piece away from the movable spring leading-out piece swings elastically.

According to another aspect of the present disclosure, a relay includes a relay movable spring capable of reducing temperature rise of the present disclosure.

According to another aspect of the present disclosure, a relay with multiple contact structures includes a base, a magnetic path structure and at least two contact structures. The magnetic path structure includes an armature, and each of the contact structures includes a movable spring. The base is provided with at least two grooves having the same number as the contact structures. The at least two grooves are respectively arranged at both sides of the base and are alternatively arranged in a row. The at least two contact structures are respectively mounted in the at least two grooves. The magnetic path structure is mounted in the base and linked with the movable springs of the at least two contact structures, to drive the action of the corresponding movable springs while the magnetic path structure is working.

According to an embodiment of the present disclosure, the magnetic path structure and one of the at least two contact structures are mounted in the same groove, a through hole is arranged between two adjacent grooves, and the armature passes through the through hole and is connected with the movable spring.

According to an embodiment of the present disclosure, a barrier is arranged in the groove where the magnetic path structure and the contact structures are mounted to achieve the separation between strong current and weak current, and the barrier is located between the contact structures and the magnetic path structure.

According to an embodiment of the present disclosure, two contact structures are provided, a position of one of two contact structures mounted in the same groove with the magnetic path structure is closer to the other of two contact structures than the magnetic path structure.

According to an embodiment of the present disclosure, a pushing part is further included, an armature has a H-shaped shape, two ends of the armature are respectively connected with the pushing part, and then connected to the movable spring through the pushing part.

According to an embodiment of the present disclosure, the movable spring includes movable contacts, a movable spring piece and a movable spring leading-out piece. The movable spring piece has a first end and a second end opposite to each other, the first end is connected with the movable spring leading-out piece, and the movable spring piece includes at least two current-carrying conductors; at least two movable contacts are provided and respectively fixed on the at least two current-carrying conductors and close to the second end of the movable spring piece, so that at least two parallel structures are formed on the movable spring piece.

According to an embodiment of the present disclosure, a at least one straight slit extends along a direction from the second end of the movable spring piece to the first end of the movable spring piece, and the at least one straight slit divides the movable spring piece into the at least two current-carrying conductors.

According to an embodiment of the present disclosure, at least one of the current-carrying conductors of the movable spring has a width larger than remaining ones of the current-carrying conductors.

According to an embodiment of the present disclosure, at least one of the movable contacts has a thickness larger than remaining ones of the movable contacts.

According to an embodiment of the present disclosure, the movable contact with the large thickness is fixed on the current-carrying conductor with the large width.

According to an embodiment of the present disclosure, a connecting piece is further mounted to the movable spring piece and connected to the at least two movable contacts.

According to an embodiment of the present disclosure, the movable spring piece comprises a plurality of sub spring pieces stacked together.

According to an embodiment of the present disclosure, a U-shaped bending part is arranged in a middle section of the movable spring piece.

According to an embodiment of the present disclosure, the movable spring comprises a first sub spring piece, a second sub spring piece, a third sub spring piece and a fourth sub spring piece stacked in sequence, wherein each of the first sub spring piece, the second sub spring piece, the third sub spring piece and the fourth sub spring piece is provided with two straight slits, to form three current-carrying conductors; and three movable contacts are provided and respectively fixed on the corresponding current-carrying conductors, so that three parallel structures are formed on the movable spring piece; a bending part is arranged on the current-carrying conductor of each of the first sub spring piece, the second sub spring piece and the third sub spring piece, and the bending part is not arranged on the current-carrying conductor of the fourth sub spring piece.

According to an embodiment of the present disclosure, an arc-shaped slit is arranged on the current-carrying conductor of the fourth sub spring piece, and is located at a side of the movable contact away from the movable spring leading-out piece, so that an end of the current-carrying conductor of the fourth sub spring piece away from the movable spring leading-out piece swings elastically.

Compared with the related art, the relay with the multiple contact structures has various advantages.

In the present disclosure, the base is provided with at least two grooves having the same number as the contact structures. The at least two grooves are respectively arranged at both sides of the base and are alternatively arranged in a row. The contact structures are respectively mounted in the corresponding grooves. The magnetic path structure is mounted in the base and linked with the movable springs of the contact structures. Such structure of the present disclosure can form separation between the contact structures in space, reduce the temperature rise affected by the increase of the rated current, meet the temperature rise requirements, and eliminate the disadvantages, such as accelerated aging of plastics and insulating materials inside the relay, arc extinguishing difficulty due to the oxidation and corrosion of the contacts, the decay of the technical parameters of the electrical components, and reduced reliability, due to that the temperature rise of the relay exceeds the given requirements.

Furthermore, the movable spring piece according to the present disclosure is divided into at least two current-carrying conductors by slits, and each of the current-carrying conductors is fixed to one of the movable contacts, so that at least two parallel structures are formed on the movable spring piece. With such structure of the present disclosure, the contact structure is configured as a multi contact parallel structure, such that the current passing through each of the current-carrying conductors can be reduced, and then the temperature rise can be reduced.

Furthermore, among the current-carrying conductors of the movable spring piece, the width of one of the current-carrying conductors is configured to be greater than the width of the other of the current-carrying conductors; and among the movable contacts, the thickness of one of the movable contacts is configured to be greater than the thickness of the other of the movable contacts. With such structure, the total resistance of the movable spring piece can be maintained in a small contact resistance state, and then the temperature rise can be reduced.

Furthermore, a connecting piece is further mounted at a side of the movable spring piece facing the static contacts, and is connected between the movable contacts. With such structure, the gap between the contacts can be ensured to be consistent while the contacts are disconnected, and the gap difference between the contacts caused by the tilting due to the pushing of the pushing part can be reduced.

According to another aspect of the present disclosure, a relay movable spring capable of reducing temperature rise includes movable contacts, a movable spring piece and a movable spring leading-out piece, wherein an end of the movable spring piece is connected with the movable spring leading-out piece. The movable spring piece includes at least two current-carrying conductors. Two movable contacts are provided and respectively fixed on the at least two current-carrying conductors. A connecting piece is further mounted on the movable spring piece and is connected with the at least two movable contacts.

According to an embodiment of the present disclosure, at least one straight slit extends in a direction from the one end of the movable spring piece to one end connected with the movable spring leading-out piece, so that the movable spring piece may be divided into at least two current-carrying conductors, so that at least two parallel structures are formed on the movable spring piece.

According to an embodiment of the present disclosure, at least one of the current-carrying conductors of the movable spring has a width larger than remaining ones of the current-carrying conductors.

According to an embodiment of the present disclosure, at least one of the movable contacts has a thickness larger than remaining ones of the movable contacts.

According to an embodiment of the present disclosure, the movable contact with the large thickness is fixed on the current-carrying conductor with the large width.

According to an embodiment of the present disclosure, the movable spring piece comprises a plurality of sub spring pieces stacked together.

According to an embodiment of the present disclosure, a U-shaped bending part is arranged in a middle section of the movable spring piece.

According to an embodiment of the present disclosure, the movable spring comprises a first sub spring piece, a second sub spring piece, a third sub spring piece and a fourth sub spring piece stacked in sequence, wherein each of the first sub spring piece, the second sub spring piece, the third sub spring piece and the fourth sub spring piece is provided with two straight slits, to form three current-carrying conductors; and three movable contacts are provided and respectively fixed on the corresponding current-carrying conductors, so that three parallel structures are formed on the movable spring piece; a bending part is arranged on the current-carrying conductor of each of the first sub spring piece, the second sub spring piece and the third sub spring piece, and the bending part is not arranged on the current-carrying conductor of the fourth sub spring piece.

According to an embodiment of the present disclosure, an arc-shaped slit is arranged on the current-carrying conductor of the fourth sub spring piece, and is located at a side of the movable contact away from the movable spring leading-out piece, so that an end of the current-carrying conductor of the fourth sub spring piece away from the movable spring leading-out piece swings elastically.

Compared with the related art, the relay movable spring capable of reducing temperature rise has various advantages.

The movable spring piece in the present disclosure includes at least two current-carrying conductors. At least two movable contacts are provided and respectively fixed on the corresponding current-carrying conductors, so that at least two parallel structures are formed on the movable spring piece, and thus the current passing through each of the current-carrying conductor can be reduced, and then the temperature rise can be reduced.

Furthermore, a strip-shaped connecting piece is further mounted on a side of the movable spring piece for matching with the static contacts of the relay, and is connected to the movable contacts, so that the gap between the contacts can be ensured to be consistent when the movable contacts and the static contacts are disconnected, and a problem of inconsistent gap caused by tilting due to the pushing of the pushing part can be eliminated.

Furthermore, in the movable spring piece of the present disclosure, at least one of the current-carrying conductors is configured to have a width larger than remaining ones of the current-carrying conductors, at least one of the movable contacts is configured to have a thickness larger than remaining ones of the movable contacts. With this structure, the total resistance of the movable spring piece can be maintained in a small contact resistance state, and thus the temperature rise can be reduced.

The present disclosure will be further described in detail with reference to the drawings and the embodiments. However, the relay with multiple contact structures according to the present disclosure is not limited to the embodiments.

BRIEF DESCRIPTION OF THE DRAWINGS

The above and other features and advantages of the present disclosure will become more apparent by the detailed description of the exemplary embodiments thereof with reference to the accompanying drawings.

DETAILED DESCRIPTION

Figure 1:
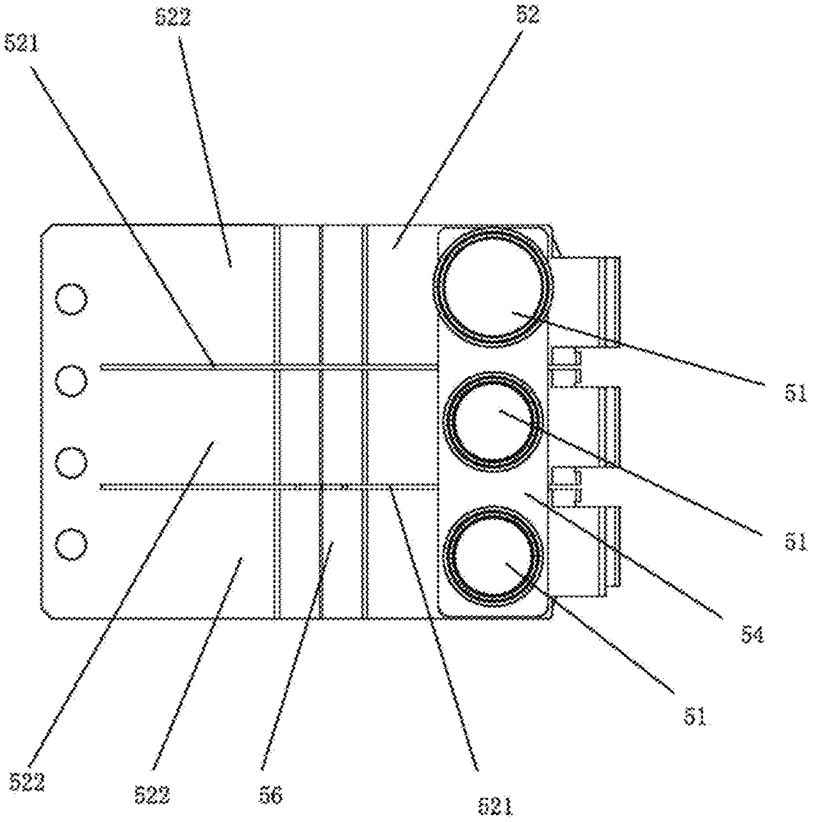
FIG. 1 is a schematic assembling view of an embodiment of a relay movable spring capable of reducing temperature rise according to the present disclosure.

Now, the exemplary implementations will be described in more detail with reference to the accompanying drawings. However, the exemplary implementations can be implemented in various forms and should not be construed as limiting the implementations as set forth herein. Although terms having opposite meanings such as "up" and "down" are used herein to describe the relationship of one component relative to another component, such terms are relative and are used herein only for the sake of convenience, for example, "in the direction illustrated in the figure". It can be understood that if a device denoted in the drawings is turned upside down, a component described as "above" something will become a component described as "under" something. When a structure is described as "above" another structure, it may mean that the structure is integrally formed on another structure, or, the structure is "directly" disposed on another structure, or, the structure is "indirectly" disposed on another structure through an additional structure.

Words, such as "one", "an/a", "the" and "said," are used herein to indicate the presence of one or more elements/component parts/and others. Terms "including", "comprising", and "having" have an inclusive meaning which means that there may be additional elements/component parts/and others in addition to the listed elements/component parts/and others. Terms “first”, “second”, and “third” are used herein only as markers, and do not limit the number of objects modified after them.

A relay with multiple contact structures according to the present disclosure may include a base, a magnetic path structure, and at least two contact structures. The base may be provided with at least two grooves having the same number as the contact structures. At least two grooves are respectively arranged at both sides of the base and are alternatively arranged in a row. At least two contact structures are respectively mounted in at least two grooves. The magnetic path structure is mounted in the base and linked with at least two contact structures of the movable springs, respectively, to drive the action of the movable springs while the magnetic path structure is working. Hereinafter, the description will be made as an example of the replay with two contact structures.

Figure 2:
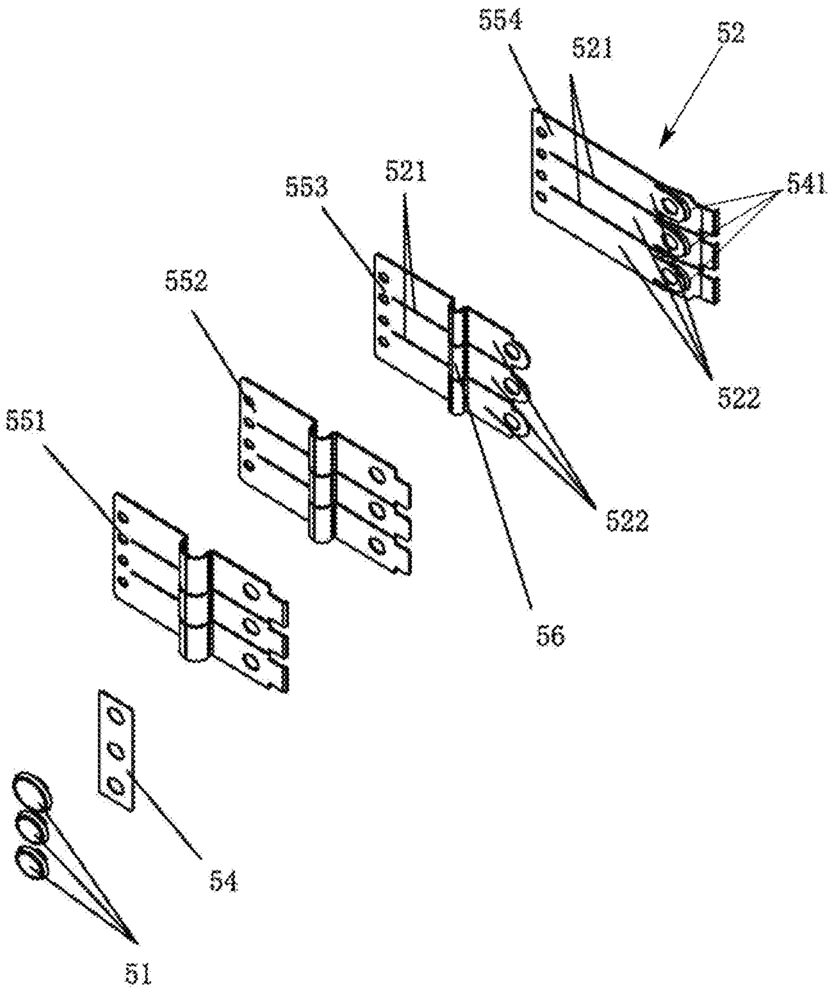
FIG. 2 is an exploded schematic view of a configuration of the embodiment of the relay movable spring capable of reducing temperature rise according to the present disclosure.

As shown in FIG. 1 and FIG. 2, the movable spring of the relay, capable of reducing temperature rise according to the present disclosure, may include movable contacts 51, a movable spring piece 52, and a movable spring leading-out piece 53. The movable spring piece 52 may have opposite first and second ends. The first end may be connected with the movable spring leading-out piece 53, and the second end of the movable spring piece 52 may be fixedly connected with the movable contacts 51.

The movable spring piece may have at least one straight slit extending in a direction from the second end thereof to the first end connected with the movable spring leading-out piece, such that the movable spring piece may be divided into at least two current-carrying conductors. The movable contacts may be provided with at least two and respectively fixed on the corresponding current-carrying conductors, such that the movable spring piece may be divided into two parallel structures. At least one of the current-carrying conductors may have a width larger than remaining ones of the current-carrying conductors, and at least one of the movable contacts may have a thickness larger than remaining ones of the movable contacts. The movable contact with a relatively large thickness is fixed on the current-carrying conductor with a relatively large width.

In an embodiment, as shown in FIG. 1, the movable spring piece 52 may have two slits 521 extending in a direction from the second end to the first end connected with the movable spring leading-out piece 53 to divide the movable spring piece 52 into three current-carrying conductors 522. Three movable contacts may be provided and respectively fixed on the corresponding current-carrying conductors 522, such that the movable spring piece 52 may be divided into three parallel structures.

In an embodiment, among the three current-carrying conductors of the movable spring piece 52, the width of one of the current-carrying conductors is greater than the width of the other two of the current-carrying conductors 522. Among the three movable contacts 51, the thickness of one of the movable contacts is greater than the thickness of the other two of the movable contacts, and the movable contact with relatively large thickness is fixed on the current-carrying conductor with relatively large width.

In an embodiment, a connecting piece 54 may be mounted to a side of the movable spring piece 52 facing static contacts, and the connecting piece 54 may be connected between the movable contacts 51. Such configuration may be provided such that the contact can be reliable due to groups of contacts. When the movable contacts and the static contacts are disconnected, the movable contacts are connected to one another by the connecting piece 54 as a whole, and the movable contacts act together. It is thus ensured that the movable contacts and the static contacts have a consistent gap therebetween, and do not interfere with each other when they are in contact in a separate path as being closed.

In an embodiment, the movable spring piece 52 is formed by four sub spring pieces stacked together.

In an embodiment, a U-shaped bending part 56 may be provided at a middle section of the movable spring piece 52.

In an embodiment, the movable spring piece 52 may include a first sub spring piece 551, a second sub spring piece 552, a third sub spring piece 553, and a fourth sub spring piece 554 sequentially stacked together. Each of the first sub spring piece 551, the second sub spring piece 552, the third sub spring piece 553, and the fourth sub spring piece 554 may be provided with two straight slits 521, so that three current-carrying conductors are formed on each of the sub spring pieces, and three movable contacts 51 are provided and are respectively fixed on the corresponding current-carrying conductors. In this way, the movable spring piece 52 may have a three-way parallel structure. Each of the current-carrying conductors of the first sub spring piece 551, the second sub spring piece 552, and the third sub spring piece 553 may be provided with a U-shaped bending part 56, and each of the current-carrying conductors of the fourth sub spring piece 554 may not be provided with a U-shaped bending part.

The current-carrying conductors of the fourth sub spring piece 554 are provided with arc-shaped slits 541 that are located at a side of the movable contacts 51 far away from the movable spring leading-out pieces 53, so that end portions of the current-carrying conductors of the fourth sub spring piece 554 far away from the movable spring leading-out piece 53 may swing elastically.

According to the present disclosure, the movable spring piece 52 is configured to have a structure in which multiple groups of contacts are in parallel, so that the current passing through each of the current-carrying conductors can be reduced, and then the temperature rise can be reduced. Strip-shaped connecting pieces 54 connected between the movable contacts 51 can ensure that the gaps between the contacts are consistent as the movable contacts and the static contacts are disconnected, which can reduce inconsistent gaps between the contacts caused by tilting while being pushed.

A relay movable spring capable of reducing temperature rise according to the present disclosure, among at least two current-carrying conductors 522 of the movable spring 52, at least one current-carrying conductor 522 may have a width larger than remaining ones of the current-carrying conductor 522. Among at least two movable contacts 51, at least one movable contact 51 may have a thickness larger than remaining ones of the movable contact 51. With such configuration, at least one current-carrying conductor 522 may have a relatively large width and at least one movable contact 51 may have a relatively large thickness. A total resistance of the movable spring piece 52 can be maintained in a small contact resistance state, thereby reducing the temperature rise.

A relay in the relevant art may have a structure that two contact structures are simultaneously linked by means of one magnetic path mechanism. Such relay may allow the magnetic path mechanism and the two contact structures to be mounted into grooves at the same side of a base, although barriers are arranged between the magnetic path mechanism and the contact structures and between the two contact structures, electronic components may generate heat due to the passage of current while the relay is working because that the magnetic path mechanism and the two contact structures are located at the same side of the base. As such, the temperature rise caused by the magnetic path mechanism and the two contact structures may be superimposed on the same side of the base. In the related art, a rated current is generally adjusted to an appropriate range, so that the product can meet the temperature rise requirements. As the application of the relay is increasing, the relay is intended to have a high load and be miniaturized; however, the increase of rated current may inevitably lead to temperature rise of the inside of the relay. As a result, an urgent problem to be solved becomes how to reduce the temperature rise in the case that an overall volume of the relay remains unchanged.

The present disclosure further provides a relay with multiple contact structures. The improvement of such structure can reduce the temperature rise affected by the increase of the rated current, meet the temperature rise requirements, and eliminate the disadvantages, such as accelerated aging of plastics and insulating materials inside the relay, arc extinguishing difficulty due to the oxidation and corrosion of the contacts, the decay of the technical parameters of the electrical components, and reduced reliability, due to that the temperature rise of the relay exceeds the given requirements.

Referring to FIGS. 3 to 6, the relay with two contact structures according to the present disclosure is shown. The relay may include a base 1, a magnetic path structure 2, a first contact structure 3, and a second contact structure 4. The base 1 may have two opposite sides, such as a front side and a back side. A first groove 11 may be provided on the front side of the base 1, a second groove 12 may be provided on the back side of the base 1, and a through hole 13 may be arranged between the first groove 11 and the second groove 12. The first groove 11 and the second groove 12 are arranged in a row in a staggered manner. That is, projections of the first groove 11 and the second groove 12 on one of the sides, for example the front side, of the base 1 are arranged in a row without overlapping each other. In other embodiments, in the case that a plurality of first grooves 11 and a plurality of second grooves 12 are provided, one second groove 12 is sandwiched between two adjacent first grooves 11, and one first groove 11 is sandwiched between two adjacent second grooves 12, for example. The second contact structure 4 may be mounted in the second groove 12.

The first contact structure 3 may be mounted in the first groove 11. The magnetic path structure 2 may be mounted in the first groove 11. In other embodiments, the magnetic path structure 2 may also be mounted at other positions of the base 1. An armature of the magnetic path structure may be connected with the movable spring 31 of the first contact structure 3, and the armature of the magnetic path structure 2 may be connected with the movable spring 41 of the second contact structure 4 through the through hole 13. The magnetic path structure 2 may drive the action of the movable spring 41 of the two contact structures while being in operation. In the present disclosure, the two contact structures may be mounted at different spatial positions of the base 1 to be separated from each other, and thus reduce the temperature rise caused by the increase of rated current.

In an embodiment, pushing parts are further included, the armature in the magnetic path structure 2 may have a H shape, each of two ends of the armature 2 may be connected with one pushing part, and connected with the movable springs in the two contact structures through corresponding pushing part. The through hole 13 may be provided at one of the ends of the armature.

Figure 3:
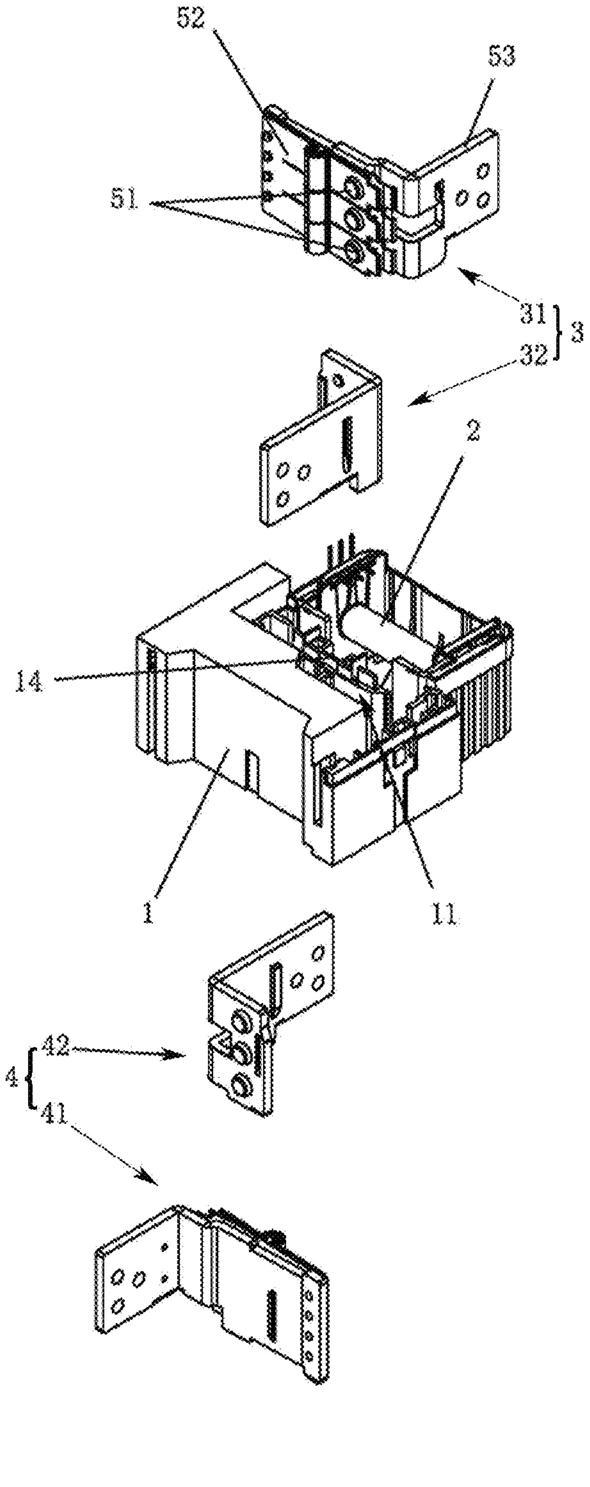
FIG. 3 is an exploded perspective view of an embodiment of a relay according to the present disclosure.
Figure 4:
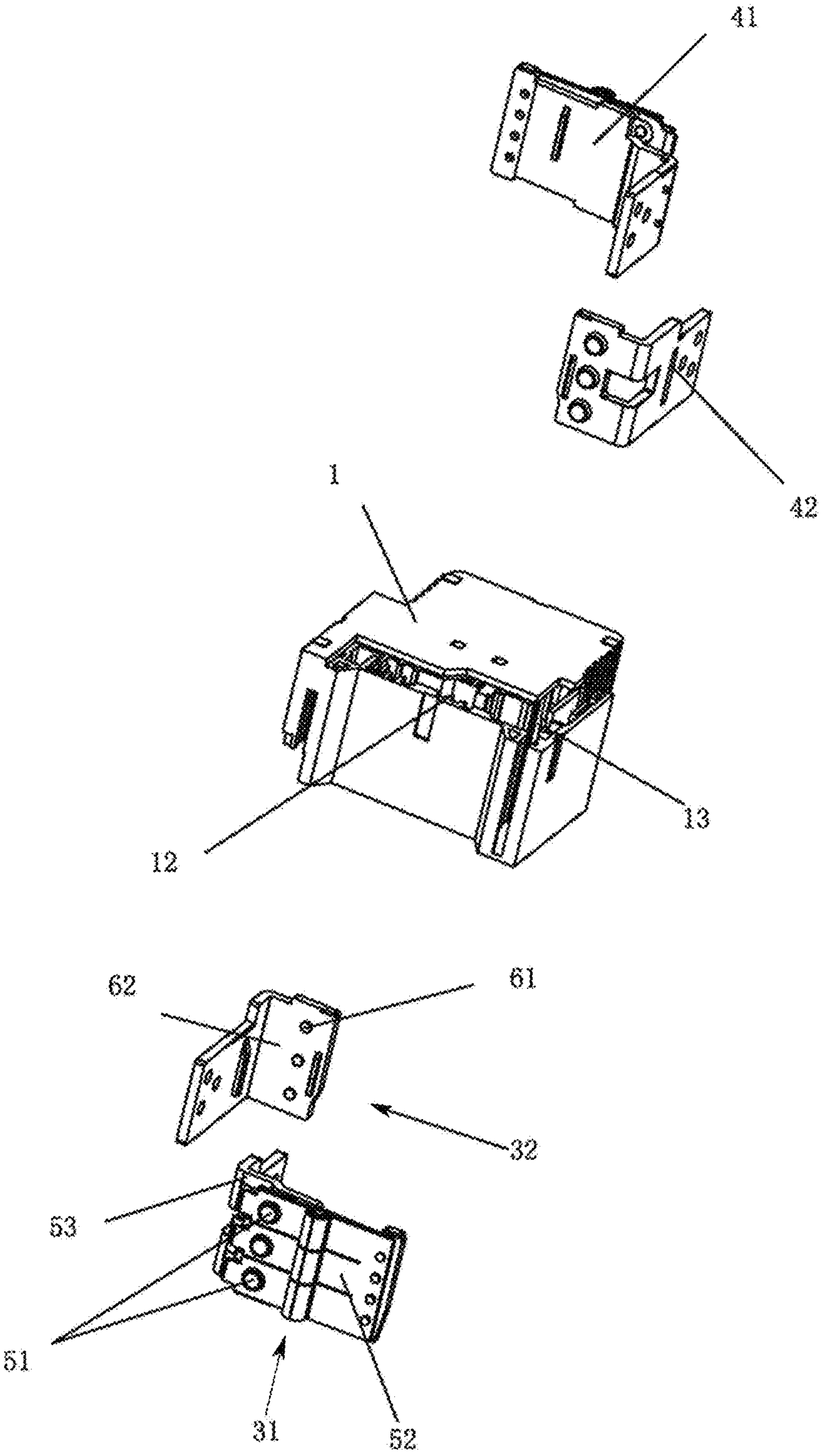
FIG. 4 is a exploded perspective view of the embodiment of the relay rotated by 180 degrees according to the present disclosure.

In an embodiment, as shown in FIGS. 3 and 4, the first contact structure 3 may include a movable spring 31 and a static spring 32, and the second contact structure 4 may include a movable spring 41 and a static spring 42. Each of the movable springs 31, 41 in the two contact structures may include a movable contact, a movable spring piece, and a movable spring leading-out piece. As an example of the movable spring 31, the movable spring 31 may include movable contacts 51, a movable spring piece 52, and a movable spring leading-out piece 53. The movable spring piece 52 may have opposite first and second ends, the first end of the movable spring piece 52 may be connected with the movable spring leading-out piece 53, and the second end of the movable spring piece 52 is fixedly connected with the movable contact 51. Each of the static springs 32 and 42 in the two contact structures may include a static contact and a static spring leading-out piece. As an example of the static spring 32, the static spring 32 may include static contacts 61 and a static spring leading-out piece 62.

The movable spring 31 and the static spring 32 may be respectively inserted into one side of the first groove 11 of the base 1, and the movable contacts 51 and the static contacts 61 may be in a corresponding and matching state (i.e., mutually aligned), so that the movable spring leading-out piece 53 of the movable spring 31 and the static spring leading-out piece 62 of the static spring 32 may extend out of the base 1, respectively. The movable spring 41 and the static spring 42 may be respectively inserted into the other side of the second groove 12 of the base 1, and the movable contacts and the static contacts are in a corresponding and matching state, so that the leading-out pieces of the movable spring 41 and the static spring 42 may extend out of the base 1, respectively.

Figure 5:
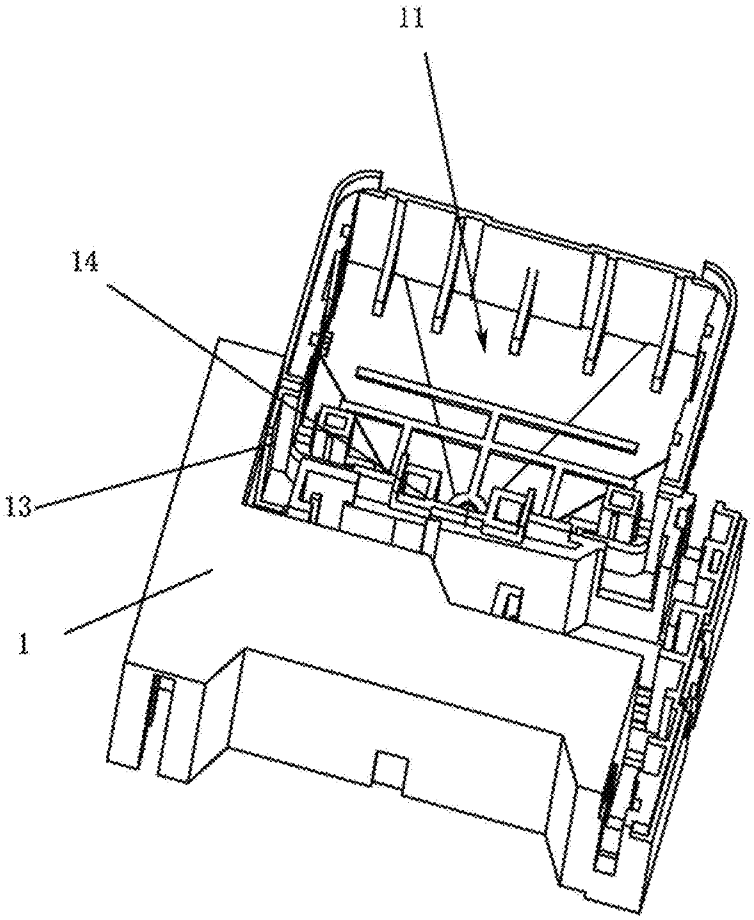
FIG. 5 is a perspective view of a base of an embodiment of the relay according to the present disclosure.
Figure 6:
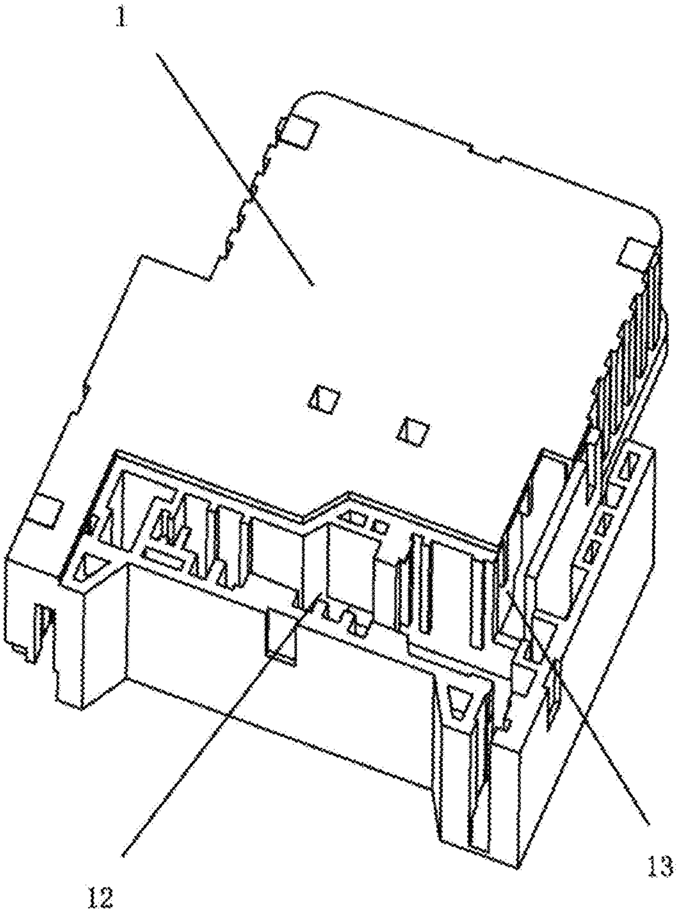
FIG. 6 is a perspective view of the base of an embodiment of the relay rotated by 180 degrees according to the present disclosure.

In an embodiment, as shown in FIGS. 3 and 5, in the first groove 11, there is a barrier 14 to achieve a separation between strong current and weak current. The barrier 14 may be separated between the first contact structure 3 and the magnetic path structure 2, and the first contact structure 3 in the first groove 11 may be arranged closer to the second contact structure 4 than the magnetic path structure 2.

In an embodiment, as shown in FIGS. 2 and 3, as an example of the movable spring 31, the movable spring 52 may be provided with two slits 521 extending in a direction from the second end to the first end connected with the movable spring leading-out piece 53, such that the movable spring 52 may be divided into three current-carrying conductors 522, and three movable contacts are provided and are fixed on the corresponding current-carrying conductors 522, such that the movable spring piece 52 may be divided into three parallel structures.

In an embodiment, one of the three current-carrying conductors of the movable spring piece 52 may be configured to have a width greater than that of the other two current-carrying conductors 522.

In an embodiment, one of the three movable contacts 51 may be configured to have a thickness greater than that of the other two movable contacts.

In an embodiment, the movable contact with a relatively large thickness may be fixed on a current-carrying conductor with a relatively large width.

In an embodiment, a connecting piece 54 may be mounted to a side of the movable spring piece 52 facing static contacts, and the connecting piece 54 may be connected between the movable contacts 51. Such configuration may be provided such that the contact can be reliable due to groups of contacts. When the movable contacts and the static contacts are disconnected, the movable contacts are connected to one another by the connecting piece 54 as a whole, and the movable contacts act together. It is therefore ensured that the movable contacts and the static contacts have a consistent gap therebetween, and cannot interfere with one another when they are in contact in a separate path as being closed.

In an embodiment, the movable spring piece 52 is formed by four sub spring pieces stacked together.

In an embodiment, a U-shaped bending part 56 may be provided at a middle section of the movable spring piece 52.

In an embodiment, the movable spring piece 52 may include a first sub spring piece 551, a second sub spring piece 552, a third sub spring piece 553, and a fourth sub spring piece 554 sequentially stacked together. Each of the first sub spring piece 551, the second sub spring piece 552, the third sub spring piece 553, and the fourth sub spring piece 554 may be provided with two straight slits 521, so that three current-carrying conductors are formed on each of the sub spring pieces, and three movable contacts 51 are provided and are respectively fixed on the corresponding current-carrying conductors. In this way, the movable spring piece 52 may have a three-way parallel structure. Each of the current-carrying conductors of the first sub spring piece 551, the second sub spring piece 552, and the third sub spring piece 553 may be provided with a U-shaped bending part 56, and each of the current-carrying conductors of the fourth sub spring piece 554 may not be provided with a U-shaped bending part.

The current-carrying conductors of the fourth sub spring piece 554 are provided with arc-shaped slits 541 that are located at a side of the movable contacts 51 far away from the movable spring leading-out pieces 53, so that end portions of the current-carrying conductors of the fourth sub spring piece 554 far away from the movable spring leading-out piece 53 may be swing elastically.

According to the relay with multiple contact structures of the present disclosure, a first groove 11 and a second groove 12 are provided on the base 1, and are alternatively arranged on both sides of the base and arranged in a row. In the two contact structures, the first contact structure 3 and the magnetic path structure 2 may be mounted in the first groove 11, and the armature of the magnetic path structure 2 may be connected with the movable spring of the first contact structure 3. The second contact structure 4 may be mounted in the second groove 12. A through hole 13 may be arranged between the first groove 11 and the second groove 12, and the armature of the magnetic path structure 2 may be connected with the movable spring of the other contact structure 4 through the through hole 13. Due to such structure, the two contact structures are separated in space to reduce the temperature rise affected by the increase of the rated current, meet the temperature rise requirements, and eliminate the disadvantages, such as accelerated aging of plastics and insulating materials inside the relay, arc extinguishing difficulty due to the oxidation and corrosion of the contacts, the decay of the technical parameters of the electrical components, and reduced reliability, due to that the temperature rise of the relay exceeds the given requirements.

According to the relay with multiple contact structures of the present disclosure, the movable spring piece 52 may be provided with at least one slit 521 extending thereon to divide the movable spring piece 52 into at least two current-carrying conductors 522. At least two movable contacts 51 may be provided and fixed on corresponding current-carrying conductors 522, such that the movable spring piece may be divided into at least two parallel structures. According to such structure of the present disclosure, the contact structure may be configured as a structure in which multi-group contact parallel structure, so that the current passing through each current-carrying conductor can be reduced, and thus the temperature rise can be reduced.

According to the relay with multiple contact structures of the present disclosure, one of the current-carrying conductors 522 of the movable spring piece 52 has a width greater than that of the other current-carrying conductors, and one of the movable contacts 51 has a thickness greater than that of the other movable contacts, and the movable contact with relatively large thickness is fixed on the current-carrying conductor with relatively large width. With such structure, the total resistance of the movable spring piece can always be maintained in a small contact resistance state, and thereby reducing the temperature rise.

According to the relay with multiple contact structures of the present disclosure, a connecting piece 54 may further be provided at a side of the movable spring piece 52 facing the static contacts, and the connecting piece 54 may be connected between the movable contacts 51. With such structure, it can be ensured that the gap between the contacts when being disconnected are consistent, and fluctuation of gap difference caused by the uneven pushing of the pushing part can be reduced.

In the case that the relay with multiple contact structures may have three contact structures, the base may be provided with three grooves arranged alternatively along two opposite sides (i.e., front and back sides) of the base, and the three grooves may be in the same row of the base. The first contact structure of the three contact structures may be mounted in the first groove on the front side of the base, the second contact structure may be mounted in a groove on the back side of the base, and the third contact structure may be mounted in the second groove on the front side of the base. As to the two contact structures adjacent to each other, for example the first contact structure and the third contact structure, are respectively on the opposite side of the base and are separated in space. As to the two contact structures separated at intervals, for example the first contact structure and the third contact structure, may be separated in space since the first groove and the second groove on the front side of the base may be separated by a groove on the opposite side.

In the case that the relay may be provided with four contact structures, the base may be provided with four grooves alternatively arranged along two opposite sides (i.e., front and back sides) of the base, and the four grooves are in the same row of the base. The first contact structure of the four contact structures may be mounted in the first groove on the front side of the base, the second contact structure may be mounted in the first groove on the back side of the base, the third contact structure may be mounted in the second groove on the front side of the base, and the fourth contact structure may be in the second groove on the opposite side of the base. As mentioned above, the two contact structures mounted adjacent to each other and the two contact structures mounted at intervals are separated in space.

In the case that the relay may have five contact structures, analogous implementations may be provided.

It should be understood that the application of the present disclosure is not limited to the detailed structure and arrangement of components provided in this specification. The present disclosure can have other embodiments, and can be implemented and carried out in various ways. The aforementioned variations and modifications fall within the scope of the present disclosure. It should be understood that the disclosure disclosed and defined in this specification may extend to all alternative combinations of two or more individual features that are apparent or mentioned in the text and/or drawings. All of the different combinations form various alternative aspects of the present disclosure. Embodiments described in this specification illustrate various embodiments for carrying out the present disclosure, and will allow those skilled in the art to utilize the present disclosure.

What is claimed is:

1. A relay movable spring for reducing temperature rise, comprising:

movable contacts, a movable spring piece, and a movable spring leading-out piece, the movable spring piece having a first end and a second end opposite to each other, the first end connected with the movable spring leading-out piece, and the movable spring piece comprising at least two current-carrying conductors;

at least two movable contacts provided and respectively fixed on the at least two current-carrying conductors and close to the second end of the movable spring piece, so that at least two parallel structures are formed on the movable spring piece, and a connecting piece mounted on the movable spring piece and connected with the at least two movable contacts, wherein:

the movable spring piece comprises a plurality of sub spring pieces stacked together;

the movable spring comprises a first sub spring piece, a second sub spring piece, a third sub spring piece, and a fourth sub spring piece stacked in sequence;

each of the first sub spring piece, the second sub spring piece, the third sub spring piece, and the fourth sub spring piece is provided with two straight slits to form three current-carrying conductors;

three movable contacts are provided and respectively fixed on the corresponding current-carrying conductors, so that three parallel structures are formed on the movable spring piece;

a U-shaped bending part is arranged on the current-carrying conductors of each of the first sub spring piece, the second sub spring piece, and the third sub spring piece, and the current-carrying conductor of the fourth sub spring piece is not provided with the U-shaped bending part; and an arc-shaped slit is arranged on the current-carrying conductor of the fourth sub spring piece, and the arc-shaped slit is located at a side of the movable contact away from the movable spring leading-out piece, so that an end of the current-carrying conductor of the fourth sub spring piece away from the movable spring leading-out piece swings elastically.

2. The relay movable spring according to claim 1, wherein at least one straight slit extends along a direction from the second end of the movable spring piece to the first end of the movable spring piece, and the at least one straight slit divides the movable spring piece into the at least two current-carrying conductors.

3. The relay movable spring according to claim 2, wherein the movable spring piece comprises a plurality of sub spring pieces stacked together.

4. A relay, comprising the relay movable spring according to claim 2.

5. The relay movable spring according to claim 1, wherein at least one of the current-carrying conductors of the movable spring has a width larger than remaining ones of the current-carrying conductors.

6. The relay movable spring according to claim 5, wherein at least one of the movable contacts has a thickness larger than remaining ones of the movable contacts.

7. The relay movable spring according to claim 6, wherein the movable contact with the large thickness is fixed on the current-carrying conductor with the large width.

8. The relay movable spring according to claim 7, wherein the movable spring piece comprises a plurality of sub spring pieces stacked together.

9. A relay, comprising the relay movable spring according to claim 7.

10. The relay movable spring according to claim 6, wherein the movable spring piece comprises a plurality of sub spring pieces stacked together.

11. A relay, comprising the relay movable spring according to claim 6.

12. The relay movable spring according to claim 5, wherein the movable spring piece comprises a plurality of sub spring pieces stacked together.

13. A relay, comprising the relay movable spring according to claim 5.

14. The relay movable spring according to claim 1, wherein a U-shaped bending part is arranged in a middle section of the movable spring piece.

15. A relay, comprising the relay movable spring according to claim 14.

16. A relay, comprising the relay movable spring according to claim 1.

* * * * *